UNITED STATES PATENT OFFICE.

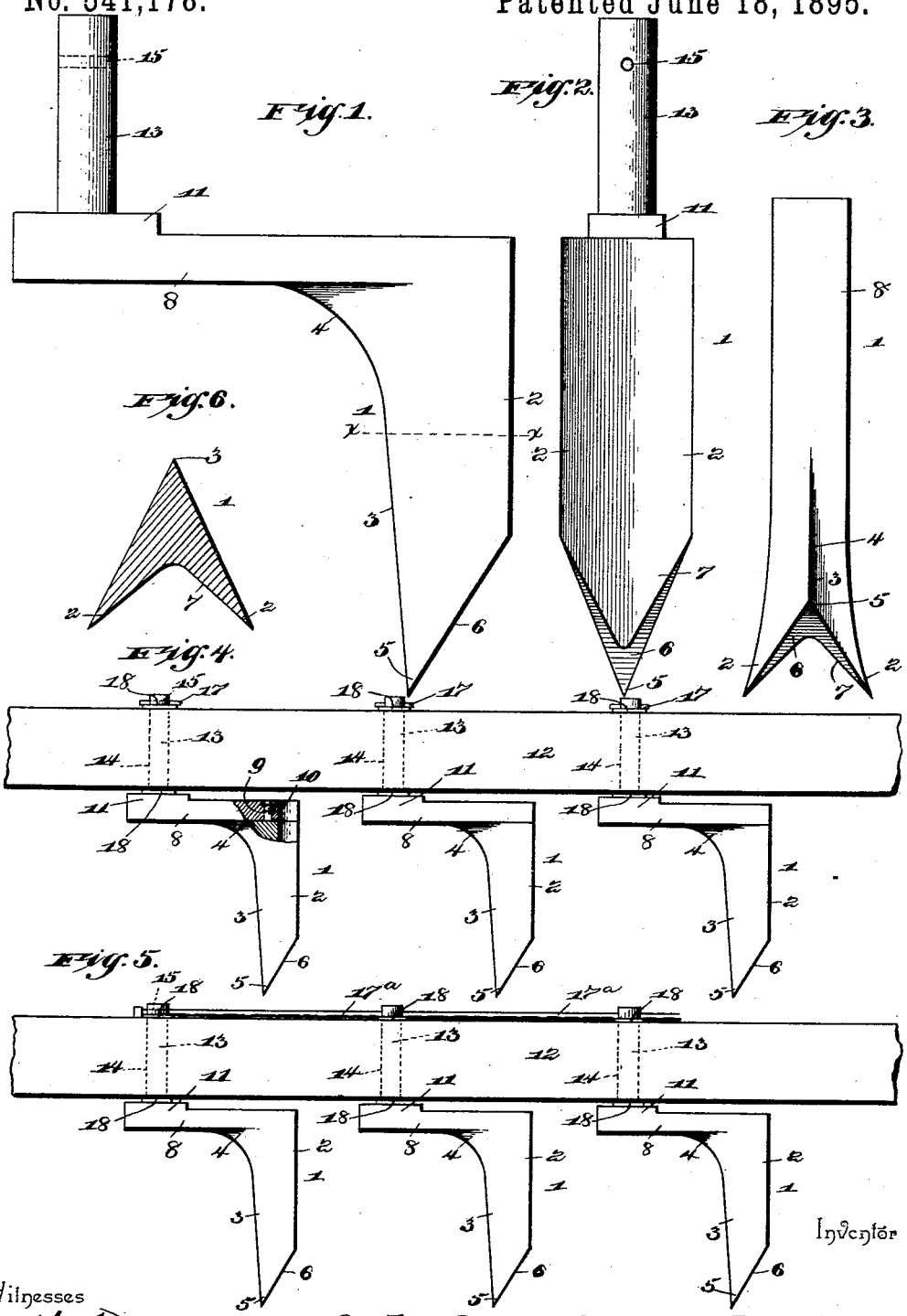
(No Model.)
S. N. PARK.
HARROW AND CULTIVATOR TOOTH.
No. 541,178. Patented June 18, 1895.
Witnesses
Wm. F. Doyle
Inventor
Staats N. Park
By his Attorneys, C. A. Snow & Co.

STAATS N. PARK, OF BLOOMSBURY, NEW JERSEY.

HARROW AND CULTIVATOR TOOTH.

SPECIFICATION forming part of Letters Patent No. 541,178, dated June 18, 1895.

Application filed September 29, 1894. Serial No. 524,507. (No model.)

*To all whom it may concern:*

Be it known that I, STAATS N. PARK, a citizen of the United States, residing at Bloomsbury, in the county of Hunterdon and State of New Jersey, have invented a new and useful Harrow and Cultivator Tooth, of which the following is a specification.

This invention relates to harrow and cultivator teeth; and it has for its object to provide a new and useful tooth of this character so constructed and arranged as to automatically move laterally or swerve to one side when coming in contact with obstructions, and also will cut its course through newly plowed soil without choking or turning over the soil, and in the attainment of these objects, providing a construction of tooth which is simple and inexpensive in construction and which will work with a much lighter draft than other teeth for the same purpose.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation of a harrow and cultivator tooth constructed in accordance with this invention. Fig. 2 is a rear end view thereof. Fig. 3 is a reverse plan view of the same. Fig. 4 is a side elevation of a series of the teeth mounted on a harrow or cultivator beam and adapted for self-adjustment. Fig. 5 is a similar view showing a series of the teeth locked stationary. Fig. 6 is a detail sectional view on the line $x\ x$ of Fig. 1.

Referring to the accompanying drawings, 1 designates a triangularly shaped harrow and cultivator tooth made of any suitable metal and in suitable sizes according to the size of machine in connection with which the same is employed. The said triangularly shaped tooth 1, essentially comprises the opposite straight vertical side wings 2, disposed at an acute angle to each other and meeting at the apex of the tooth in the front knife edge 3, extending the entire length of the tooth from the upper forwardly curved end 4, to the lower point 5, of the tooth, and at its lower end the said tooth is rearwardly and upwardly inclined as at 6, to provide for the easy entrance of the point into the soil and to allow the soil to freely pass the point without choking the same or being turned over. The said tooth 1, is preferably provided with a hollowed rear side 7, that serves to lighten the tooth, while at the same time allowing the soil to freely pass up from the point when the same enters the soil and is dragged therethrough.

The tooth 1 is provided at its upper end with a horizontal forwardly disposed swinging tooth arm 8, which is preferably integrally formed with the tooth 1, but the arm 8, and the said tooth may consist of separate parts as shown in Fig. 4, of the drawings, and may be detachably connected together by means of the connecting bolt 9, extended from the upper end of the tooth 1 and secured in the bolt opening 10, formed in the end of the arm 8, from which the tooth depends. The horizontal swinging tooth arm 8, is provided at the end opposite the tooth 1 with the thickened bearing portion 11, adapted to bear under a harrow or cultivator beam 12, to which the tooth may be attached, and projected upwardly from the thickened end 11, of the arm 8, is the journal spindle 13, that is adapted to loosely turn in a bearing opening 14 formed in the beam of the harrow or cultivator, and above the beam 12, the journal spindle 13, is provided with a key opening 15, to receive the fastening key 17, for retaining the tooth properly connected to the beam. Where it is necessary to work close, as in the case of berries and the like, if desired, the spindle 13 of the tooth may be prevented from turning by means of a continuous key rod $17^a$, that is passed through the key openings of the journal spindles of all of the teeth on the same beam of the harrow or cultivator.

In the event of the tooth being used in connection with a wooden beam 12, suitable wear washers 18 may be arranged on the spindle 13 above and below the beam, as illustrated in the drawings. It will now be obvious that by reason of the particular construction of tooth described and the preferable manner of mounting the same at one end of a horizontal arm so as to allow it to freely swing and adjust itself from side to side, to avoid obstructions, the entire tooth will swing or swerve bodily to one side when coming in contact with an obstruction and will then automatically right itself in the line of draft after the obstruction is passed, and it is to be noted that the front knife edge 3, of the tooth is disposed at an obtuse angle to the arm 8, and therefore gives the tooth a tendency to run deep, while at the same time cutting weeds, lumps and the like so that the tooth will not choke but will travel freely through the soil to thoroughly pulverize or cultivate the same.

Changes in the form, proportion, and the minor details of construction may be resorted to without departing from the principle or sacrificing any of the advantages of this invention.

Having thus described the invention, what is claimed, and desired to be secured by Letters Patent, is—

1. The combination with a horizontal tooth arm; of a triangularly shaped tooth depending from one end of said arm, said tooth comprising opposite straight vertical side wings 2, disposed at an acute angle to each other and meeting at the apex of the tooth in a front knife edge extending the entire length of the tooth and disposed rearwardly at an obtuse angle to the tooth arm, said front knife edge being provided with an upper forwardly curved portion 4, said triangularly shaped tooth being further provided with a rearwardly and upwardly inclined lower end 6, leading into a point at the lower extremity of said front knife edge, substantially as set forth.

2. The combination with a harrow or cultivator beam having a bearing opening therein; of a horizontal tooth-arm disposed below and parallel with the beam, said tooth arm being provided at one end with an integral upwardly and right angularly disposed spindle loosely mounted in the bearing opening of the beam and leaving one end of the arm free to swing in the arc of a circle, and a triangularly shaped tooth depending from the free swinging end of the tooth arm opposite the spindle and provided with opposite rearwardly divergent straight vertical side wings, said triangularly shaped tooth being adapted to swing bodily in a lateral direction with the swinging end of the tooth arm to automatically clear obstructions, substantially as set forth.

In testimony that I claim the foregoing as my own I have hereto affixed my signature in the presence of two witnesses.

STAATS N. PARK.

Witnesses:
 CHARLES S. ALLEN,
 JAMES ABLE.